US 6,553,389 B1

(12) United States Patent
Golding et al.

(10) Patent No.: US 6,553,389 B1
(45) Date of Patent: Apr. 22, 2003

(54) RESOURCE AVAILABILITY DETERMINATION MECHANISM FOR DISTRIBUTED DATA STORAGE SYSTEM

(75) Inventors: Richard Andrew Golding, San Francisco, CA (US); Elizabeth Lynn Borowsky, Brookline, MA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/394,238

(22) Filed: Sep. 13, 1999

(51) Int. Cl.[7] .............................................. G06F 17/30
(52) U.S. Cl. ........................ 707/202; 707/205; 707/204; 707/200; 707/10; 709/221
(58) Field of Search .................... 714/6; 711/162, 711/113, 114; 707/202, 7, 10, 200, 204, 205; 709/221, 220, 248

(56) References Cited

U.S. PATENT DOCUMENTS

| | | | | |
|---|---|---|---|---|
| 5,394,526 A | * | 2/1995 | Crouse et al. .................. 707/2 |
| 5,403,639 A | * | 4/1995 | Belsan et al. ................ 707/204 |
| 5,764,972 A | * | 6/1998 | Crouse et al. .................. 707/2 |
| 5,778,411 A | * | 7/1998 | DeMoss et al. ............... 710/68 |
| 5,829,053 A | * | 10/1998 | Smith et al. .................... 711/4 |
| 5,860,079 A | * | 1/1999 | Smith et al. .................... 711/4 |
| 5,996,075 A | * | 11/1999 | Matena ........................ 713/200 |
| 6,243,814 B1 | * | 6/2001 | Matena ........................ 713/200 |
| 6,247,019 B1 | * | 6/2001 | Davies ......................... 340/989 |

OTHER PUBLICATIONS

A. El Abbadi and S. Toueg, "Maintaining availability in partitioned replicated databases." ACM Transactions on Database Systems, 14(2):264–90, Jun. 1989.

* cited by examiner

*Primary Examiner*—Jean M. Corrielus

(57) ABSTRACT

A distributed data storage system is provided with a mechanism for determining data storage resource availability during data system failures. When a partition occurs, a coordinator requests all reachable replicas to begin a new epoch and each replica responds with its most recent epoch number and the list of replicas that it believes were active in that epoch. From the responses, the coordinator finds the maximum epoch number and the list of replicas in that epoch is taken as the list from which a quorum must be drawn. The coordinator establishes a quorum when, for each byte in the virtual store, the coordinator receives responses from more than half of the replicas for that byte. The coordinator then determines resource availability and sends out a message to all the reachable replicas with a new epoch number greater than the previous epoch number and the list of replicas active in this new epoch. The replicas receive this message, record the epoch number and the list of replicas, and proceed.

20 Claims, 4 Drawing Sheets

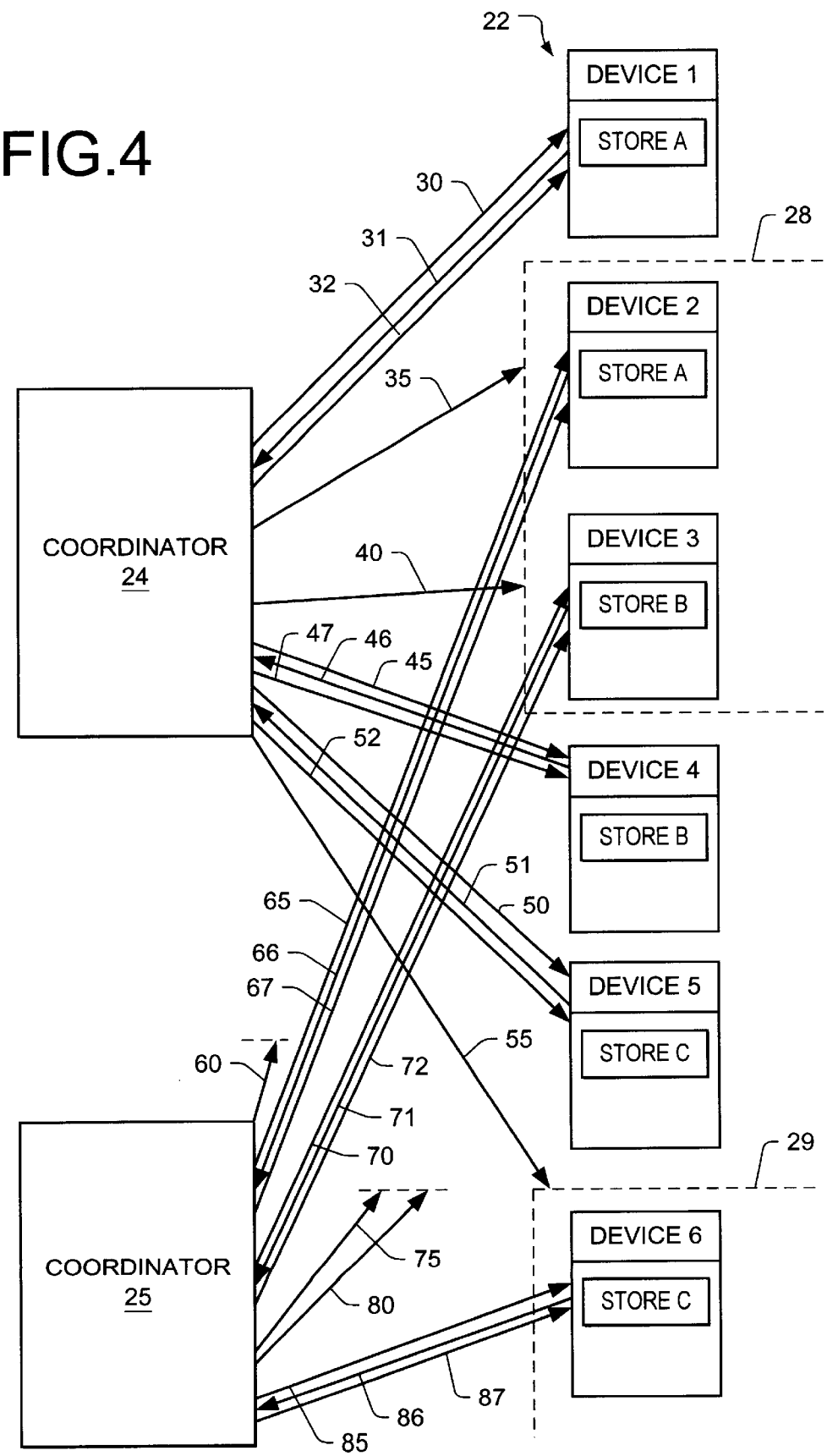

RESOURCE AVAILABILITY DETERMINATION MECHANISM FOR DISTRIBUTED DATA STORAGE SYSTEM

TECHNICAL FIELD

The present invention relates generally to distributed data storage systems and more particularly to determining resource availability in such systems during transient failures.

BACKGROUND

In the past, the storage network, which linked a host such as a computer and its related data storage system, was fairly slow. As a result, data was generally not distributed across the data storage system because such distribution would increase access time.

With the advent of fiber optic technology for the data storage network, it becomes possible to have extremely fast access to data even when it is placed remotely and it is placed on a number of different data storage devices. One of the advantages of placing data, or "striping" data, on a number of different data storage devices is that the data storage devices can be accessed in parallel so the bandwidth can be substantially increased. Essentially, striping involves placing a first set of bytes on the first data storage device, the next set of bytes on the next data storage device, etc., and then wrapping around so the fourth set of bytes is placed on the first data storage device, etc. With three data storage devices, there is essentially three times the bandwidth over that of a single data storage device. This is essentially how a RAID array (redundant array of inexpensive disks) works.

In addition, in RAID arrays, there is hardware support for striping and for "mirroring". "Mirroring" provides for replication of data on a number of separate devices for more rapid access and redundancy. The reason hardware support is required, for example for mirroring, is if the data is read-only, it can be read from whichever data storage device is faster, but if writes are performed, the write must be propagated to all copies. Further, if two hosts are writing to the same data at the same time, it is necessary for the writes to be consistent. While the hardware support for these storage arrays are fairly well developed, the same is not true for networks of data storage devices.

For distributed data storage systems, problems occur when some data storage devices fail. The data storage devices stop responding to messages and send no further messages. This has the effect of logically separating the failed data storage devices from the rest. Portions of the data storage network can also fail, which can lead to a "partitioning". In partitioning the data system splits the hosts and the data storage devices in the data storage system into two or more "partitions". Within a partition, all the hosts and data storage devices can communicate with each other, but no communications are possible between partitions. In many cases, the data storage system can not distinguish between a partitioning and the failure of one or more data storage devices. Thus, it is not possible to determine resource availability.

In particular, data storage systems that provide "virtual stores" to users present a special problem. A "virtual store" is a logical structure that appears to the host application as if it were a data storage device of a given capacity, but in reality the data in the virtual store is spread over multiple real data storage devices. For example, data can be minored to improve its availability and can be striped to improve bandwidth. Both of these approaches result in multiple data storage devices being involved in storing the data for the virtual store. When the virtual store is updated, all the data storage devices holding part of the virtual data space being updated must be updated. If not one data storage device will lose synchronization with the others, and a host that tries to read from that data storage device will see inconsistent data.

During partitioning, a host will be able to read some data storage devices, but not necessarily all. Further, two hosts in two different partitions will be only able to reach devices in their own partitions. If left uncontrolled, the data storage devices in different partitions will lose synchronization if the two hosts write only to the devices within their own partitions. If data are supposed to be mirrored, or if there are consistency requirements between different data, this is a major problem.

The typical solution is to "lock out" access to data in all but at most one partition. That is, at most one partition is chosen as "active", and only hosts in that partition can access data. In all other partitions, hosts will be locked out or denied access until the data storage devices or the network are repaired.

The most common way of ensuring that the data are accessible in at most one partition is to require that there be a "quorum" of data storage devices in the partition. Typically, a "quorum" is defined as a majority of the data storage devices that store copies of the data. At the present time, it is entirely possible that no partition will contain a majority of the devices, and so the data will be totally inaccessible.

In a distributed data storage system, a quorum is not enough for correct operation. In addition, it is important that all of the data space in the virtual store be covered by data storage devices in the partition. For example, a virtual store can have its data space divided into three parts. Each part is mirrored so that six separate data storage devices each hold a portion of the data for the virtual store. A simple majority of the data storage devices can be formed by taking both of the mirrors of the first two-thirds of the data space. However, there may be no devices in the partition storing any of the last third of the data. This means that all the data would be unavailable despite having a quorum because of the lack of complete "coverage" of the data. Thus, a distributed data storage system requires both a quorum of devices and coverage of the data space.

In the past, mechanisms for establishing a quorum were only concerned with the replication of a single datum.

The data storage system was considered as moving through a sequence of "epochs" with a failure or repair defining the transition from one epoch to the next. At each epoch boundary, a protocol is run in each partition to determine what data storage devices are available in the partition and whether access will be allowed in the partition during that epoch.

At the end of the protocol, the data storage devices in at most one partition will have determined that they have a quorum so that access can continue in that partition. Those data storage devices may then elect to regenerate replicas into other data storage devices in that partition so that a proper degree of redundancy is available. This complicates the protocol for deciding when a partition has a quorum, because the population of data storage devices from which a quorum must be drawn changes over time. To handle the changing population of replicas, each replica maintains an epoch number and a list of the replicas active in that epoch.

Protocols of this type are known to provide good availability as long as there are three or more replicas. When there are only two replicas, both must be available in a partition to have more than half available, so that the failure of at least one renders the data unavailable. This results in lower availability than with a single replica. Thus, there is no truly effective way of determining data storage resource availability during data system failures for distributed data storage systems.

DISCLOSURE OF THE INVENTION

The present invention provides a data storage system including a virtual data store having a plurality of portions of data and a plurality of data storage devices connectable to said virtual store capable of storing portions of said data of said virtual store. A coordinator is connectable to at least one of said plurality of data storage devices and is responsive to information therein to allow recovery of said data storage system after a partitioning of said plurality of data storage devices when said at least of one of said plurality of data storage devices contains all of said plurality of portions of said data to have complete coverage of said virtual store.

The above and additional advantages of the present invention will become apparent to those skilled in the art from a reading of the following detailed description when taken in conjunction with the accompanying drawings.

BRIEF DESCRIPTION OF THE DRAWINGS

FIG. 4 is a partitioned data storage system with "coverage and no quorum".

BEST MODE FOR CARRYING OUT THE INVENTION

Figure 1:
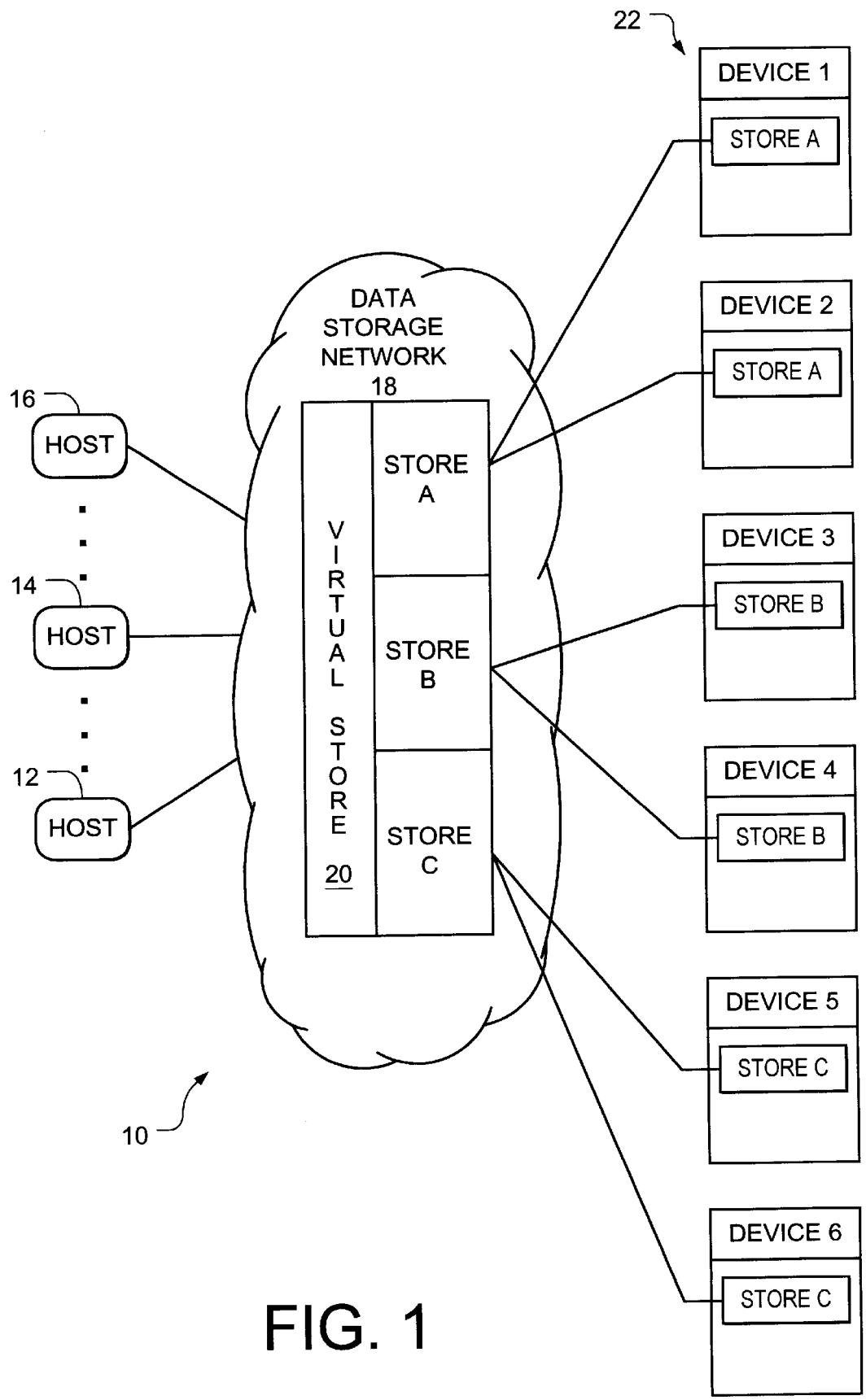
FIG. 1 is an overview illustration of the data system of the present invention.

Referring now to FIG. 1, therein is shown a data system 10 having a plurality of hosts 12 through 16 with hosts 12, 14, and 16 being shown as typical. The hosts 12 through 16 are devices or systems such as computers, terminals, user devices, etc. which run different types of computer applications and access different blocks of data.

The plurality of hosts 12 through 16 are connected to a data storage network 18 which could be a local area network (LAN), a wide area network (WAN), the Internet, or any other communication network. In the best mode, the storage network 18 is a high-speed, optical data transmission network.

The storage network 18 contains a virtual store 20 whose data space is divided into a plurality of data blocks or stores which are mirrored. The data blocks are designated as store A, B, and C. The virtual store 20 is connected to a plurality of data storage devices 22 which are designated as device 1 through 6. It will be understood that the virtual store 20 can contain fewer or more data stores and the plurality of data storage devices 22 can contain fewer or more data storage devices.

The data blocks in the virtual store 20 are striped across the plurality of data storage devices 22 such that device 1 contains store A, device 3 contains store B, and device 6 contains store C. The virtual store 20 is mirrored so device 2 contains a mirror or replication of store A, device 4 contains a mirror or replication of store B, and device 6 contains a mirror or replication of store C.

Figure 2:
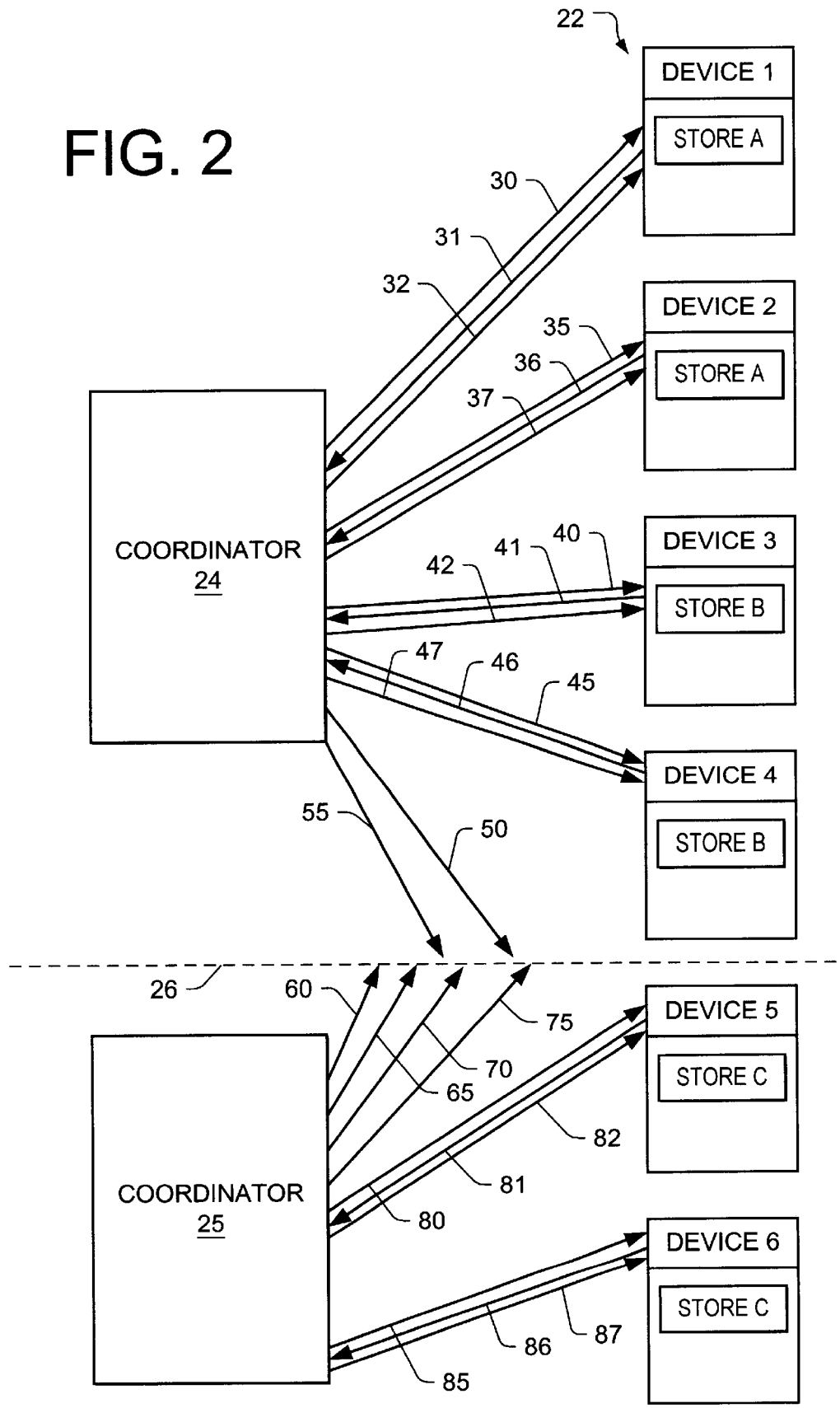
FIG. 2 is a partitioned data storage system where there is "a quorum and no coverage"

Referring now to FIG. 2, therein is shown a partitioned data storage system where there is "a quorum and no coverage". Two coordinators 24 and 25 provide messages to and from the plurality of data storage devices 22. The coordinators 24 and 25 can be either hardware or software, i.e. they can be implemented as separate hardware or be a software process running on a host or data storage device as would be evident to those skilled in the art.

FIG. 2 shows a partition 26 which partitions the plurality of data storage devices 22 into two partitions. Within one partition are the devices 1 through 4 which can communicate with each other and the coordinator 24 but not with the coordinator 25 or the devices 5 through 6. In the other partition are devices 5 through 6 which can communicate with each other and the coordinator 25 but not with the coordinator 24 or the devices 1 through 4.

A plurality of arrows indicates the communication protocol of various messages among the coordinators 24 and 25 and the devices 1 through 6. Messages 30, 35, 40, 45, 50, and 55 from the coordinator 24 are sent to the respective devices 1 through 6 and messages 60, 65, 70, 75, 80, and 85 are sent from the coordinator 25 to the respective devices 1 through 6. Due to the partition 26, messages 50 and 55 do not reach their respective devices 5 and 6 and messages 60, 65, 70, and 75 do not reach devices 1 through 4. Return messages 31, 36, 41, and 46 from respective devices 1 through 4 to the coordinator 24 and messages 81 and 86 from the respective devices 5 and 6 to the coordinator 25 contain epoch numbers, layouts, and layout version for the data stores that they contain. Messages 32, 37, 42, and 47 from the coordinator 24 to the devices 1 through 4 and the messages 82 and 87 from the coordinator 25 to the devices 5 and 6 indicate the starting of a new epoch and which data storage devices with the highest layout version numbers will be included in the new epoch.

Figure 3:
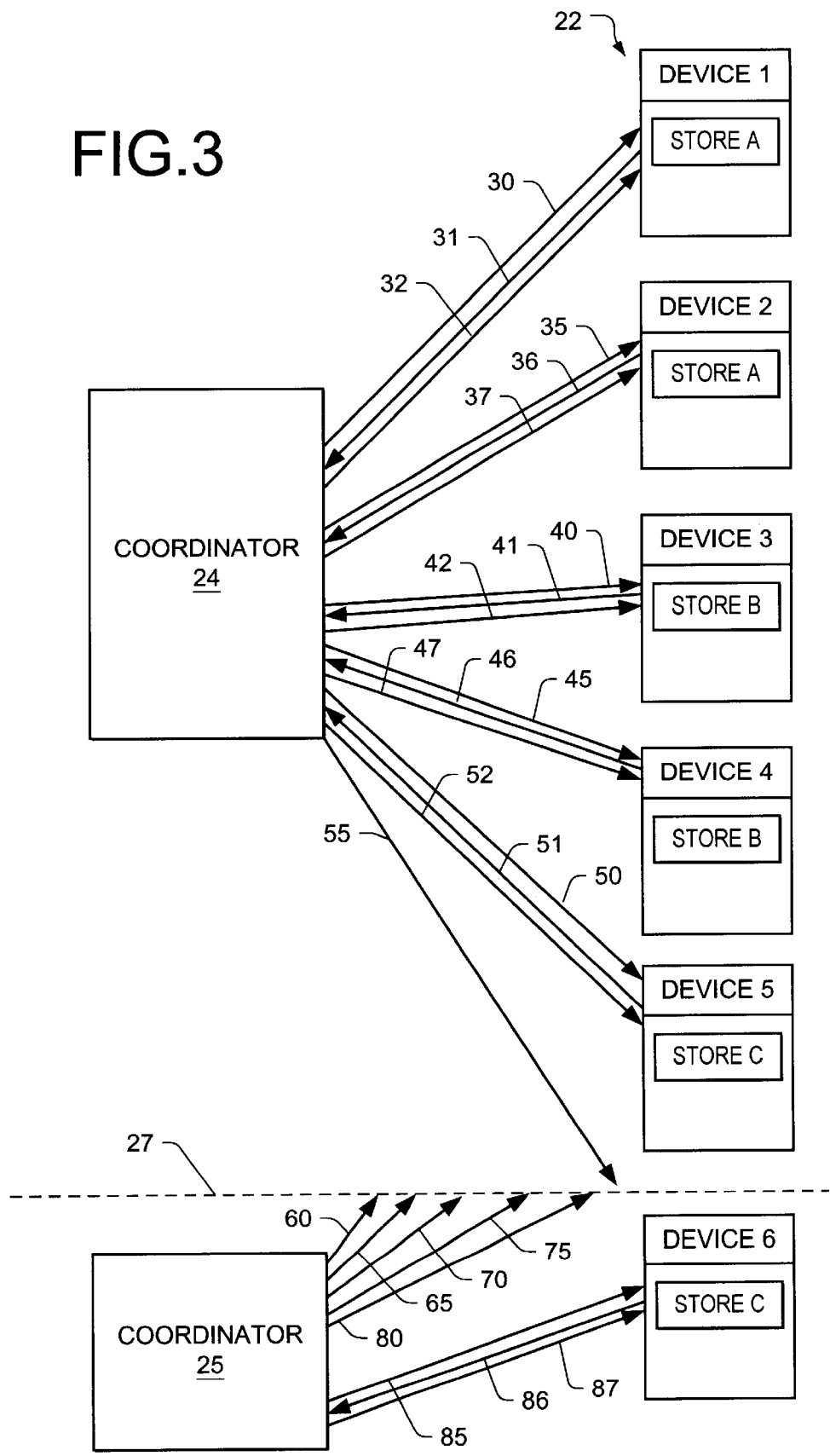
FIG. 3 is a partitioned data storage system where there is "a quorum and coverage"

Referring now to FIG. 3, therein are shown a partitioned data storage system where there is "a quorum and coverage". The same configuration of the plurality of data storage devices 22 and coordinators 24 and 25 as in FIG. 2 are shown with the same numbers being used to designate the same messages. A partition 27 partitions the plurality of data storage devices 22 into two partitions. The first partition contains the coordinator 24 and the devices 1 through 5 and the second partition contains the coordinator 25 and the device 6. Since device 5 is now on the same side of the partition 27 as the coordinator 24, it responds to the message 50 to provide a status message 51 and receives the epoch message 52.

Referring now to FIG. 4, therein is shown a partitioned data storage system with "coverage and no quorum". The same configuration of the plurality of data storage devices 22 and the coordinators 24 and 25, as in FIG. 2, are shown with the same numbers being used to designate the same messages. Two partitions 28 and 29 partition the plurality of data storage devices 22 in to two partitions. A first partition contains the coordinator 24 and then services 1, 4, and 5 and a second partition contains the coordinator 25 and the devices 2, 3, and 6.

In FIG. 4 are shown status messages 66 and 71 from devices 2 and 3 to the coordinator 25 and epoch messages 67 and 72 from the coordinator 25 to the devices 2 and 3.

In operation, the hosts 12 through 16 access the virtual store with almost the same ease that a computer will access its local hard disk drive. The striping and mirroring of the virtual store 20 over the plurality of data storage devices 22 is transparent to the host. When the virtual store 20 is updated, all the data storage devices in the plurality of data storage devices 22 which are holding part of the virtual data space being updated must be written-to. This is to assure that all of the plurality of data storage devices 22 stay in synchronization with all the others so that a host will always see consistent data.

When a problem arises, such as one or more of the data storage devices crashing, the plurality of data storage devices 22 will partition with some of the data storage devices on one side of the partition and others on the other.

In the past, without virtual stores, a partitioning meant that a host would be able to reach some data storage devices and not others. Further, two hosts in different partitions were only able to reach data storage devices in their own partitions and the data storage devices in different partitions would get out of synchronization.

The typical solution was to lock out access to data in all but at most one "active" partition. The most common way of ensuring that the data are accessible in at most one partition was to require there be a "quorum" or majority of data storage devices in the active partition.

Chronologically, the entire system was considered as moving through a sequence of "epochs" with a failure or repair defining the switch from one epoch to the next. For example, a failure would be considered the dividing time between a first and a second epoch and the recovery from the failure would be the dividing line between a second and third epoch. At each epoch boundary a protocol was run in each partition to determine what data storage devices were available in the partition, and whether access would be allowed to the partition during that epoch.

At the end of the protocol, the data storage devices in at most one partition would have been determined to have a quorum so that access could continue in that partition. Those data storage devices could then elect to regenerate replicas onto other data storage devices in that partition so that a proper degree of redundancy would be available. Since the population of data storage devices from which a quorum must be drawn changed over time, each replica maintained an epoch number and a list of replicas active in that epoch.

A traditional single-datum replication protocol determines whether the datum is accessible in a partition as follows:

1. upon a failure, a coordinator sends a message to all reachable data storage devices requesting them to begin a new epoch;
2. each data storage device responds with its most recent epoch number and the list of replicas that it believes were active in that epoch;
3. once the coordinator has received status messages from all the reachable data storage devices, it finds the status message with the maximum epoch number and the list of replicas in that epoch is taken as the list from which a quorum must be drawn;
4. if the coordinator has established responses from more than half of the replicas that were active in the previous epoch, then it has established a quorum;
5. the coordinator sends out an epoch message with a new epoch number (greater than the previous maximum epoch number) to the reachable data storage devices, and the list of replicas active in this new epoch; and
6. the data storage devices receive the epoch message and record the new epoch number and list of replicas.

There are many variations on the above protocol intended to reduce the overhead in special situations or improve availability. These protocols are known to provide good availability as long as there are three or more replicas. When there are only two replicas, both must be available in a partition to have more than half available, so that a failure of at least one renders the data unavailable, resulting in lower availability than with a single replica.

For the system shown in FIG. 1, for virtual stores 18 which may have data striped and/or mirrored over multiple data storage devices, it is required that, for each byte in the virtual store 20, there is a quorum of data storage devices that store that byte. This is done by changing the condition in step 4 above:

4.a. if, for each byte in the virtual store 20, the coordinator 24 or 25 has received responses from more than half the replicas for that byte that were active in the previous epoch, then it has established a quorum.

This works but the difficulty is that it inherits the flaw of the single-datum replication protocol, which has low availability when data are stored only on two replicas. Since mirroring is the typical configuration for distributed data storage systems, the above protocol will result in low availability in typical systems.

The best mode further changes the condition in step 4 above:

4.b. If the coordinator has received responses from more than half of the data storage devices that were active in the previous epoch, and for each byte in the data store, at least one device from the previous epoch that stores a replica of that byte has responded, then the coordinator has established a quorum.

It should be noted that basing the active partition merely on the quorum is insufficient in distributed data systems because if all the data is not present, there is no reason to let the system recover with missing data.

Thus, it is necessary to have two criteria for recovering. One is that there is a quorum and the second is that there is complete coverage of the data. This provides for a fail-safe situation since the majority provides that no other partition will recover and coverage provides that the data is coherent to recover.

In FIG. 2 is an example of how the protocol of the present invention operates. With the plurality of data storage devices 22 partitioned at the partition 26, the devices 1 through 4 are the quorum of devices 1 through 6. However, devices 1 through 4 only contain the striped and mirrored portions of store A and store B of the virtual store 20. The striped and mirrored portion of store C is in the minority partition. Thus, there is no reason for there to be a recovery since some of the data is missing.

In FIG. 3, with devices 1 through 5 on one side of the partition, they form a quorum of devices 1 through 6. Further, since device 5 contains a replica of store C, there is coverage so the recovery can proceed.

In the traditional protocol when the response is received from the quorum, it can change to a new epoch. Once it changes to a new epoch, the store is recovered and data is available again. In the present invention one criteria has been changed so instead of waiting for a quorum, the wait is for both the quorum and coverage of the data store. Full coverage is required before a change to a new epoch.

In FIG. 4, the devices 1, 4, and 5 are in one partition and the devices 2, 3, and 6 are in another partition defined by the partitions 28 and 29. Each of the partitions has full coverage, but there is no quorum. Although there is coverage, there is no quorum since equal numbers of the data storage devices are in each partition. If one of the data storage devices in one of the partitions has crashed and recovered, there would be no way of determining which had the correct data.

It should be noted that having coverage is more important than having a quorum. As long as a mechanism is provided so only one partition which contains complete coverage is active, this is sufficient for the beginning of a new epoch.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A data storage system comprising:
   a virtual data store having a plurality of portions of data;
   a plurality of data storage devices connectable to said virtual store capable of storing portions of said data of said virtual store; and
   a coordinator connectable to at least one of said plurality of data storage devices responsive to information therein to allow recovery of said data storage system after a partitioning of said plurality of data storage devices when said at least one of said plurality of data storage devices contains all of said plurality of portions of said data to have complete coverage of said virtual store.

2. The data storage system as claimed in claim 1:
   said coordinator is connectable to another of said plurality of data storage devices, said coordinator responsive to the content of said another of said data storage devices to allow recovery of said data storage system after a partitioning of said plurality of data storage devices when said at least one or said another of said plurality of data storage devices contains complete coverage of said virtual store and only said at least one of said plurality of data storage devices containing complete coverage of said virtual store is used in the recovery.

3. The data storage system as claimed in claim 2 wherein:
   said coordinator connected to a further at least one of said plurality of data storage devices, said coordinator responsive to the content of said further one of said data storage devices to allow recovery of said data storage system after a partitioning of said plurality of data storage devices when at least one of said partition of plurality of data storage devices contains complete coverage of said virtual store and said one partition contains a quorum of said data storage devices.

4. The data storage system as claimed in claim 3 wherein:
   said virtual store is striped across said plurality of data storage devices.

5. The data storage system as claimed in claim 3 wherein:
   said virtual store is mirrored on said plurality of data store devices.

6. The data storage system as claimed in claim 3 wherein:
   said plurality of data storage devices contain status information; and
   said coordinator requests and receives status information from said plurality of data storage devices only from one partition of said plurality of data storage devices.

7. The data storage system as claimed in claim 3 wherein:
   said plurality of data storage devices contains status information thereof;
   said coordinator requests and receives status information from said data storage devices in only one partition of said plurality of data storage devices; and
   further coordinators which request and receive status information from said plurality of data storage devices, each of said plurality of coordinators requesting and receiving status information from one partition of said plurality of data storage devices.

8. The data storage system as claimed in claim 3 wherein:
   each of said plurality of data storage devices contains status information; and
   said coordinator requests and receives status information from each of said plurality of data storage devices in one partition, said coordinator:
      requests all of said plurality of data storage devices in said one partition to begin a new epoch, each of said plurality of data storage devices provides the most recent epoch number thereof and a list of data storage devices active in the most recent epoch,
      determines the maximum epoch number and the number of data storage devices active in that epoch,
      determines if more than half of the data storage devices that were active in the previous epoch to establish a quorum,
      sends out to all said plurality of data storage devices in said one partition a new epoch number, greater than the previous epoch number, and the list of data storage devices active in the new epoch, and
      determines that at least some of said plurality of data storage devices in said one partition collectively contain the contents of said virtual store.

9. The data storage system as claimed in claim 3 wherein:
   each of said plurality of data storage devices contains status information; and
   said coordinator determines for each portion of said data in said virtual store that said coordinator has received responses for more than half of said data storage devices containing said portion of said data.

10. The data storage system as claimed in claim 1 including:
    a storage network containing said virtual store; and
    a plurality of hosts connected to said storage network.

11. A distributed data storage system comprising:
    a virtual data store having a plurality of portions of data;
    a plurality of data storage devices connected to said virtual store, each of said to plurality of data storage devices capable of storing at least one portion of said data of said virtual store; and
    a coordinator connectable to said plurality of data storage devices responsive to the contents thereof to allow recovery of said distributed data storage system after a partitioning of said plurality of data storage devices when said plurality of data storage devices connected to said coordinator contains all portions of said data to have complete coverage of said virtual store, said coordinator responsive to the contents of said plurality of data storage devices to prevent recovery of said distributed data storage system after a partitioning of said plurality of data storage devices when said plurality of data storage devices connected to said coordinator do not contain all portions of said data to have complete coverage of said virtual store.

12. The distributed data storage system as claimed in claim 11:
    said coordinator is connectable to another of said plurality of data storage devices, said coordinator responsive to the content of said another of said data storage devices to allow recovery of said data storage system after a partitioning of said plurality of data storage devices when said at least one of said another of said plurality of data storage devices contains complete coverage of said virtual store and only said at least one of said plurality of data storage devices containing complete coverage of said virtual store is used in the recovery.

13. The distributed data storage system as claimed in claim 12 wherein:

said coordinator connected to a further at least one of said plurality of data storage devices, said coordinator responsive to the content of said further one of said data storage devices to allow recovery of said data storage system after a partitioning of said plurality of data storage devices when at least one of said partition of plurality of data storage devices contains complete coverage of said virtual store and said one partition contains a quorum of said data storage devices.

14. The distributed data storage system as claimed in claim 13 wherein:

said virtual store is striped across said plurality of data storage devices.

15. The distributed data storage system as claimed in claim 13 wherein:

said virtual store is mirrored on said plurality of data store devices.

16. The distributed data storage system as claimed in claim 13 wherein:

said plurality of data storage devices contain status information regarding the most recent epoch number, a list of data storage devices active in said most recent epoch, and the layout of said data therein; and said coordinator requests and receives said status information from said plurality of data storage devices only from one partition of said plurality of data storage devices.

17. The distributed data storage system as claimed in claim 13 wherein:

said plurality of data storage devices contain status information regarding the most recent epoch number, a list of data storage devices active in said most recent epoch, and the layout of said data therein;

said coordinator requests and receives said status information from said data storage devices in only one partition of said plurality of data storage devices; and further coordinators which request and receive status information from said plurality of data storage devices, each of said plurality of coordinators requesting and receiving status information from one partition of said plurality of data storage devices.

18. The distributed data storage system as claimed in claim 13 wherein:

each of said plurality of data storage devices contains status information; and said coordinator requests and receives status information regarding the most recent epoch number, a list of data storage devices active in said most recent epoch, and the layout of said data from each of said plurality of data storage devices in one partition, said coordinator:

requests all of said plurality of data storage devices in said one partition to begin a new epoch, each of said plurality of data storage devices provides the most recent epoch number thereof and a list of data storage devices active in the most recent epoch, determines the maximum epoch number and the number of data storage devices active in that epoch, determines if more than half of the data storage devices that were active in the previous epoch to establish a quorum, sends out to all said plurality of data storage devices in said one partition a new epoch number, greater than the previous epoch number, and the list of data storage devices active in the new epoch, and determines that at least some of said plurality of data storage devices in said one partition collectively contain the contents of said virtual store.

19. The distributed data storage system as claimed in claim 13 wherein:

each of said plurality of data storage devices contains status information regarding the most recent epoch number, a list of data storage devices active in said most recent epoch, and the layout of said data therein; and said coordinator determines for each portion of said data in said virtual store that said coordinator has received responses for more than half of said data storage devices containing said portion of said data.

20. The data storage system as claimed in claim 11 including:

a storage network containing said virtual store; and a plurality of hosts connectable to said storage network to read and write data to said virtual store.

* * * * *